United States Patent
Yatomi

[11] Patent Number: 5,909,421
[45] Date of Patent: *Jun. 1, 1999

[54] REPRODUCING AND RECORDING APPARATUS AND METHOD FOR DUBBING VIDEO DATA

[75] Inventor: Toshiya Yatomi, Sagamihara, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/780,795

[22] Filed: Jan. 9, 1997

[30] Foreign Application Priority Data

Jan. 16, 1996 [JP] Japan .................................... 8-005108
Dec. 25, 1996 [JP] Japan .................................... 8-345433

[51] Int. Cl.⁶ ...................................................... G11B 7/00
[52] U.S. Cl. .................................. 369/84; 369/85; 360/15
[58] Field of Search ............................... 369/84, 85, 83, 369/47, 48, 59, 58, 54, 32; 360/13, 15, 16

[56] References Cited

U.S. PATENT DOCUMENTS

| | | | |
|---|---|---|---|
| 5,392,164 | 2/1995 | Takahashi | 360/15 |
| 5,434,715 | 7/1995 | Eigeldinger et al. | 360/15 |
| 5,440,432 | 8/1995 | Aoki | 360/15 X |
| 5,515,211 | 5/1996 | Kawamura | 360/15 X |

*Primary Examiner*—Muhammad N. Edun
*Attorney, Agent, or Firm*—Fitzpatrick, Cella, Harper & Scinto

[57] ABSTRACT

Reproducing and recording apparatus and method for dubbing video data includes structure and steps employed in a system for copying encoded video data recorded on a first recording medium to a second recording medium. Structure and steps are provided for reproducing from the first recording medium (i) the encoded video data and (ii) identification data indicating an area of the first recording medium in which the video data is not to be reproduced. Structure and steps are also provided for supplying the reproduced encoded video data to the recording apparatus for recording on the second recording medium. Structure and steps are also provided for controlling the recording operation of the recording apparatus and the reproducing operation of the reproducing apparatus according to the identification data.

39 Claims, 5 Drawing Sheets

REPRODUCING AND RECORDING APPARATUS AND METHOD FOR DUBBING VIDEO DATA

BACKGROUND OF THE INVENTION

1. Field of the Invention

The present invention relates to reproducing and recording apparatuses and, more particularly, to apparatuses used in a system which transmits digital data reproduced by a reproducing apparatus to a recording apparatus to record the reproduced digital data.

2. Description of Related Art

Conventionally, "dubbing" has been carried out in which two video tape recorders (VTRs) for reproducing and recording, respectively, are used and video data or another type of data (which has been reproduced using a reproducing apparatus) is transmitted to a recording apparatus to record the data.

Specifically, to perform dubbing, a tape cassette is set in the recording VTR, then the recording tape is fed to a position where the recording is to be started and it is paused there.

In the reproducing VTR, the reproducing tape is fed to a position where an image to be dubbed is recorded and it is paused there.

After both recording VTR and the reproducing VTR have been set ready for dubbing, a user places the reproducing VTR in a reproducing mode and the recording VTR in a recording mode, then begins dubbing.

When the tape on the reproducing VTR reaches the end of dubbing, the user stops the recording VTR and the reproducing VTR to terminate the dubbing.

According to such a dubbing method, however, if the reproducing tape has an area which should not be dubbed, then the foregoing dubbing operation has to be repeated before and after the area, which is extremely cumbersome.

SUMMARY OF THE INVENTION

It is an object of the present invention to solve the problem described above.

It is another object of the present invention to permit easier operation for copying data from a recording medium such as a magnetic cassette tape.

It is yet another object of the present invention to provide a novel function used in reproducing data from a storage device which is integrally equipped with two types of recording media.

To these ends, according to the present invention, there is provided, as an embodiment thereof, a reproducing apparatus employed in a system for copying encoded video data which has been recorded in a first recording medium to a second recording medium by a recording apparatus, the reproducing apparatus being equipped with: reproducing means for reproducing the encoded video data and identification data indicating an area, which need not be reproduced, in the first recording medium from the first recording medium; output means for supplying the encoded video data, which has been reproduced by the reproducing means, to the recording apparatus, wherein the recording apparatus records the video data output by the output means to a second recording medium; and control means for controlling the recording operation of the recording apparatus and the reproducing operation of the reproducing means according to the identification data which has been reproduced by the reproducing means.

According to a further aspect of the present invention, a recording apparatus employed in a system for (i) reproducing encoded video data recorded on a first recording medium using a reproducing apparatus, and (ii) copying the reproduced encoded video data to a second recording medium, wherein a recording operation of the recording apparatus is controlled by said reproducing apparatus includes (a) receiving means for receiving from the reproducing apparatus (i) the encoded video data reproduced from said first recording medium, and (ii) identification data indicating an area of the first recording medium in which the video data is not to be reproduced; and (b) recording means for recording the video data, received by said receiving means, on the second recording medium. The recording operation of the recording means is controlled in accordance with the identification data.

According to another aspect of the present invention, a reproducing apparatus employed in a system which reproduces encoded video data from a first storing device integrally equipped with a first recording medium and a second recording medium (different from each other in type), and copies the reproduced video data to a second storing device using a recording apparatus includes (a) reproducing means for (i) reproducing the encoded video data from said first recording medium, and (ii) reproducing identification data (which indicates a skip area in said first recording medium) from the second recording medium; (b) output means for supplying the encoded video data (which has been reproduced by the reproducing means) to the recording apparatus; and (c) control means for controlling the reproducing operation of the reproducing means and the recording operation of the recording apparatus in accordance with the identification data which has been reproduced by the reproducing means.

According to yet another aspect of the present invention, a recording apparatus for use with a reproducing apparatus which reproduces encoded video data from a first storing device which is integrally equipped with a first recording medium and a second recording medium (which are different from each other in type), said recording apparatus copying the reproduced video data to a second storing device, wherein the recording operation of the recording apparatus is controlled by the reproducing apparatus, includes (a) receiving means for receiving (i) the encoded video data which has been reproduced from said first recording medium by said reproducing apparatus, and (ii) identification data which has been reproduced from said second recording medium by said reproducing apparatus, said identification data indicating a skip area of said first recording medium; (b) recording means for recording the video data, received by said receiving means, to said second storing device. A recording operation of the recording means being controlled by the reproducing apparatus according to the identification data received by the receiving means.

According to still another aspect of the present invention, a system which (i) reproduces encoded video data from a storing device which is integrally equipped with a first recording medium and a second recording medium (which are different from each other in type), and (ii) copies the reproduced video data to a second storing device which is integrally equipped with a third recording medium and a fourth recording medium (which are also different from each other in type), includes (A) a reproducing apparatus including (a) reproducing means for reproducing the encoded video data from said first recording medium, and for reproducing from the second recording medium subordinate data related to the video data, (b) first control means for generating control data for controlling a reproducing operation of said reproducing means and a recording operation of a recording apparatus according to the subordinate data reproduced by the reproducing means, and (c) output means for outputting the reproduced encoded video data and reproduced control data to an outside of said reproducing apparatus. The system also includes (B) a recording apparatus comprising: (a) receiving means for receiving the reproduced encoded video data and the reproduced control data output from said output means, (b) recording means for recording the video data received by said receiving means on said second storing device, and (c) second control means for controlling the recording operation of said recording means in accordance with the control data received by said receiving means.

According to still a further aspect of the present invention, a reproducing and recording method employed with a system which reproduces digital video data from a first cassette tape using a first VTR, and copies the reproduced digital video data to a second cassette tape using a second VTR, wherein the first VTR has a normal reproduction mode and a search mode, and wherein the second VTR has a recording mode and a recording pause mode, comprises the steps of (a) automatically changing the mode of the second VTR from the recording mode to the recording pause mode when the mode of the first VTR changes from the normal reproduction mode to the search mode, and (b) automatically changing the mode of the second VTR from the recording pause mode to the recording mode when the mode of the first VTR changes from the search mode to the normal reproduction mode.

Other objects and features of the present invention will become apparent from the following detailed description of an embodiment of the invention taken in connection with the accompanying drawings.

DETAILED DESCRIPTION OF THE PREFERRED EMBODIMENT

An embodiment of the present invention will be described.

The embodiment relates to a case where the present invention is applied to a system which employs two digital VTRs to copy data recorded in a cassette incorporating a semiconductor memory.

Figure 1:
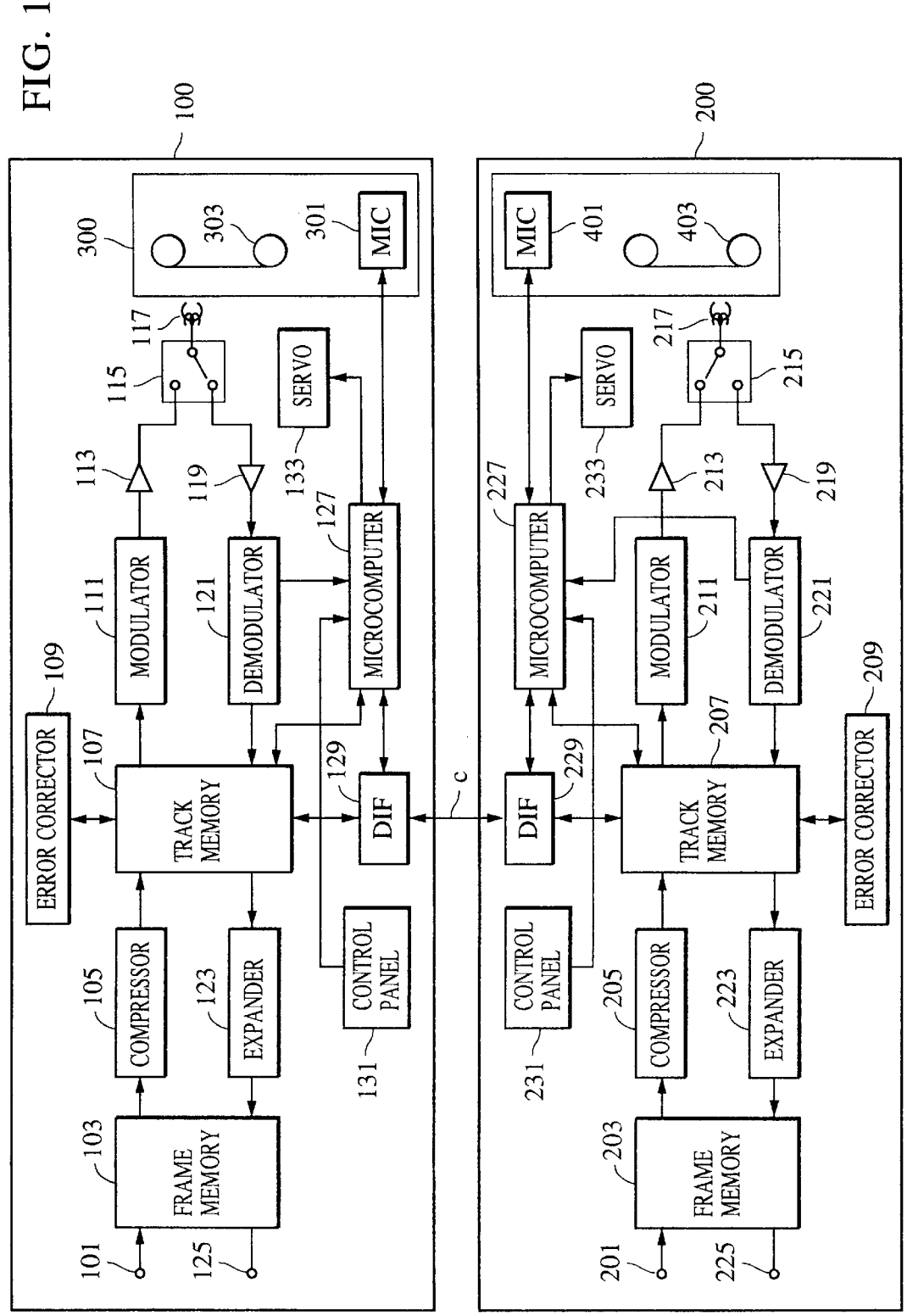
FIG. 1 is a diagram showing the configuration of a VTR system representing an embodiment of the present invention.

FIG. 1 is a diagram showing the configuration of the aforesaid system.

In this embodiment, the data recorded in a cassette 300 is reproduced by a VTR 100 and the reproduced data is transmitted to a VTR 200 which copies the received data to a cassette 400. In the following description of recording and reproducing operations, only video data will be referred to; however, it is apparent that audio data would be recorded and reproduced also as digital data.

The VTR 100 includes the following: an input terminal 101 through which digital video data is supplied; a frame memory 103 for storing the digital video data of a plurality of frames (two frames in this embodiment), which have been entered, and the digital video data, the information content of which has been expanded by an expander 123 as it will be discussed later; a compressor 105 which compresses an amount of the video data and encodes the video data, which has been read from the frame memory, by using a well-known data compressing technique; a track memory 107 for storing the video data of a plurality of frames (three frames in this embodiment), which has been compressed and encoded by the compressor 105, and the video data which has been demodulated by a demodulator 121 as will be discussed later; an error corrector 109 which accesses the track memory 107 to add parity data to the compressed and encoded video data stored in the track memory so as to generate an error correction code composed of the video data and the parity data at the time of recording and which corrects an error in reproduced video data by using the parity data, which has been added during recording, at the time of reproducing; a modulator 111 which digitally modulates the video data, which has been error-corrected and encoded, so as to modulate it to data in a format suited for magnetic recording; an amplifier 113; a switch 115; and a head 117 for recording and reproducing data to and from a tape 303 of the cassette 300.

Reference numeral 119 denotes an amplifier which amplifies reproduced data. The demodulator 121 carries out demodulating processing in accordance with the modulating processing carried out at the time of recording. The expander 123 carries out reverse processing from the processing, which has been implemented at the time of recording, on reproduced data in order to decode the reproduced data and also to expand the information amount thereof. Reference numeral 125 denotes a terminal through which reproduced video data is output.

The VTR 100 further includes a microcomputer 127 which records and reproduces data to and from a semiconductor memory 301 provided in the cassette 300; a digital interface (hereinafter referred to as "DIF") 129 which outputs reproduced video data or another type of data as it is in the compressed and encoded digital data format to external equipment; and a control panel 131 on which switches through which instructions for recording, reproducing, etc. are entered are mounted.

The cassette 300 incorporates the memory (hereinafter referred to as "MIC") 301 for storing data (hereinafter referred to as "system data") related to (i) the data which has been recorded in the magnetic tape 303 and to (ii) the magnetic tape 303 itself.

A VTR 200 and a cassette 400 share the same configurations as those of the foregoing VTR 100 and the cassette 300, respectively.

A typical recording operation in the configurations described above will be described first.

Upon receipt of a recording instruction entered through the control panel 131 by a user, the microcomputer 127 controls respective sections of the VTR 100. Firstly, the digital video data entered through the terminal 101 is written to the frame memory 103 and the reading order is updated, thereby carrying out shuffling.

The shuffled video data is sent to the compressor 105 which compresses the information amount thereof by using well-known techniques such as DCT, quantization, and variable-length encoding, and encodes it before writing it to the track memory 107.

At this time, the microcomputer 127 generates the system data related to the video data to be recorded, e.g. a time code indicating a record time and such data as a track number on a tape on which the video data is to be recorded, and it writes the generated system data as subcode data to the track memory 107.

The error corrector 109 accesses the track memory 107 to add parity data to the compressed and encoded video data and the subcode data, thereby generating error correction codes composed of the compressed and encoded video data and the parity data. The modulator 111 carries out digital modulation such as interleaved NRZI on the video data which has been subjected to the error correction coding so as to suppress DC components in the data and also to superimpose a pilot signal component for tracking control during reproduction, thereby modulating the data to signals in a format suited for magnetic recording before supplying them to the head 117 via the amplifier 113 and the switch 115.

At the time of recording, the tape 303 is fed at a predetermined speed by a servo 133 controlled by the microcomputer 127; the head 117 traces the tape 303 and forms many helical tracks to record digital video data, digital audio data, and subcode data.

Figure 2:
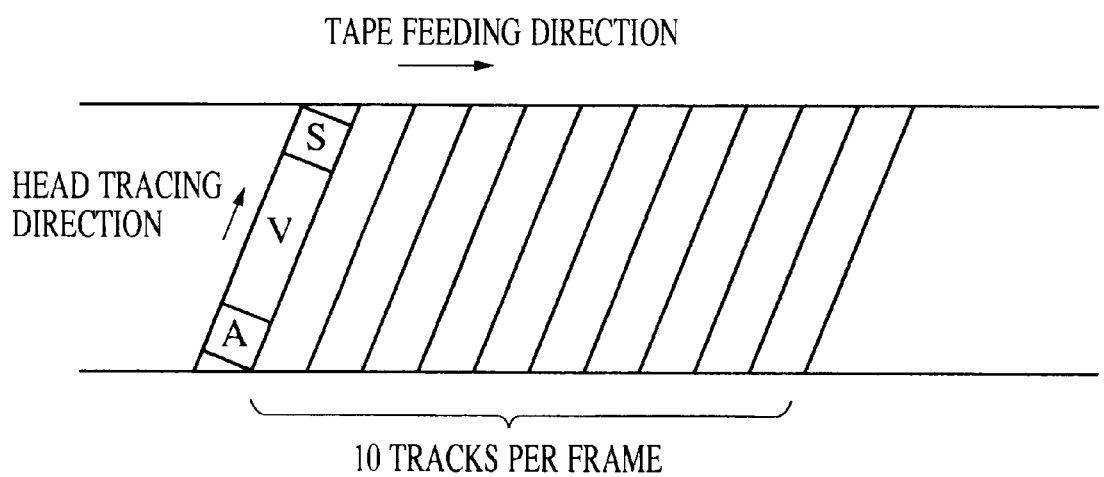
FIG. 2 is a diagram showing a recording format on a tape used by the system shown in FIG. 1.

FIG. 2 shows the recording format on the tape.

In FIG. 2, the tracks have an audio data area, a video data area, and a subcode area, in the order in which the head traces; data corresponding to each area is recorded. In this embodiment, video data in one frame is recorded on ten tracks.

Then, at the time of reproducing, upon receipt of an instruction which specified reproducing operation through the control panel 131, the microcomputer 127 controls respective sections to reproduce data from the tape 303.

The video data reproduced through the head 117 is supplied to the demodulator 121 via the switch 115 and the amplifier 119.

The demodulator 121 demodulates the reproduced data and writes it to the track memory 107 and also extracts the pilot signal component from the reproduced data and sends it to the microcomputer 127. The microcomputer 127 generates a signal for controlling a capstan motor, not shown, in accordance with the extracted pilot signal component and applies the signal to the servo 133 which controls the feeding speed of the tape 303 according to the control signal received from the microcomputer 127.

The error corrector 109 accesses the track memory 107 to correct errors in the reproduced video data and the subcode data.

The microcomputer 127 reads the subcode data written to the track memory 107 and stores it in an internal memory so as to control respective sections of the VTR using the subcode data as it will be discussed later.

The video data which has been subject to the error correcting process is supplied to the expander 123 wherein the video data is decoded by the opposite processing from the processing implemented at the time of recording and the information amount is expanded. The video data, the information amount of which has been expanded and which has been converted back to the original format, is output through the terminal 125.

Prior to recording or reproducing, the microcomputer 127 reads system data from the MIC 301 and stores it in the internal memory when the cassette 300 is inserted in the VTR 100. The microcomputer 127 generates system data appropriate for the recording and reproducing operation and writes it to the MIC 301 again when the power of the VTR 100 is turned OFF or the cassette 300 is ejected.

System data recorded in the MIC 301 includes, for example, the data which indicates the start and end of recording video data on the tape 301. The microcomputer 127 generates the data, which indicates a position where the recording of video data is to be started, namely, the data of an absolute track number denoting a serial track number continuing from the head of the tape; it also generates at the same time a header which denotes that the foregoing data indicates the recording start position. The microcomputer 127 also generates the data which indicates a position where the recording of video data is to be ended, namely, an absolute track number, and a header which denotes that the foregoing data indicates the recording end position.

The data indicating the recording start and end positions is recorded also in the subcode area on the tape 301 as subcode data.

The DIF 129 converts the reproduced video data and subcode data, which have been written to the track memory 107 and the errors of which have been corrected, to data in a predetermined format suited for transmission, and it outputs them out of the VTR 100.

The above describes the recording and reproducing operation of the VTRs in this embodiment. Each of the VTRs in this embodiment is equipped with a function for fast feeding a part, where unwanted data which should not be reproduced has been recorded among the data recorded on the tape.

More specifically, a skip flag is generated as system data and recorded in the MIC 301 and the subcode area of the tape 303. The skip flag is composed of data which indicates the start and end positions (absolute track numbers) of a section on the tape where unwanted data has been recorded, data which shows that the data indicates the start position or the end position of the unwanted section, and data which specifies the processing to be carried out on the data of the unwanted section.

During reproduction, when the tape reaches the position which has been recorded in a skip flag read from the MIC 301 or when a skip flag which has been recorded on the tape is detected, the tape is fed fast to the end position of the unwanted section, thereby preventing the data in the unwanted section from being reproduced.

The following will describe the operation of writing the skip flag.

Figure 3:
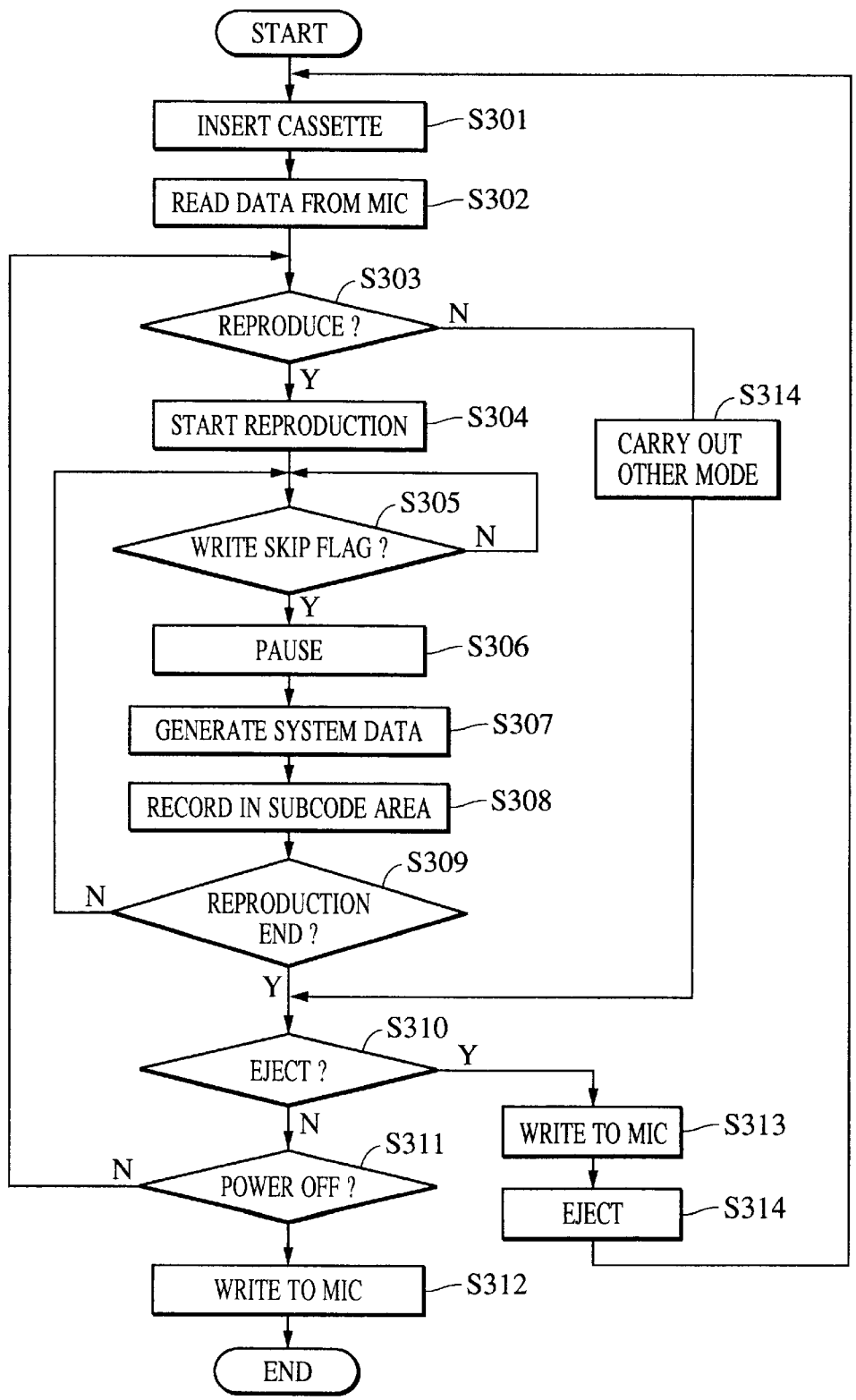
FIG. 3 is a flowchart illustrating the recording operation of a skip flag in the embodiment of the present invention.

FIG. 3 shows a flowchart which illustrates the operation of the microcomputer 127 for writing the skip flag.

When the cassette 300 is set on the VTR 100 (step S301), the system data stored in the MIC 301 is read and written to the internal memory as previously mentioned (step S302). The microcomputer 127 waits for an instruction specifying reproduction given through the control panel 131 and as soon as the instruction for reproduction is received, it controls the respective sections of the VTR to reproduce the data recorded on the tape 303 as described above (steps S303 and S304).

The user operates a skip flag writing switch on the control panel 131 when an unwanted section is reproduced while watching the reproduced video data so as to decide the skip start position first (step S305).

When writing of a skip flag is specified, the tape feed is interrupted (step S306). Then, as mentioned above, the skip flag is generated by using the number data of a track (included in subcode) following the stop position; the generated skip flag is written to the track memory 107 and the memory in the microcomputer 127 (step S307).

Upon completion of the generation of the skip flag, the feed of the tape 303 is resumed, and the skip flag stored in the track memory 107 is now recorded in the subcode area of ten tracks of the first frame in the unwanted section on the tape 303 by the head 117 (step S308).

Upon completion of the record of the skip flag in the tape 303, the microcomputer 127 checks whether a reproduction end has been specified through the control panel 131 (step S309), and it sets the VTR for the reproduction mode again when reproduction is to be continued so as to repeat the reproduction of data from the tape 303.

Thereafter, the processing from the steps S305 through S309 is repeated to generate, alternately, the skip flags indicating the start and end, respectively, of an unwanted section, and the generated skip flags are recorded.

If the ejection of the cassette 300 is specified (step S310) after the end of the reproducing operation has been specified in the step S309, then the system data which includes the skip flags stored in the internal memory is written to the MIC 301 (step S313) and the cassette 300 is ejected (step S314).

When it is specified to turn OFF the power of the VTR (step S311), the system data which includes the skip flags stored in the internal memory is written to the MIC 301 before terminating the operation (step S312).

If any other instruction than the reproducing instruction is given in the step S303, then the microcomputer 127 performs an operation in accordance with the instruction (step S314) before it repeats the processing of the steps S310 to S314.

Thus, the skip flags are written to MIC 301 and the tape 303.

In this embodiment, for each program, the MIC 301 may store (i) a record protect (hereinafter referred to as "RP") flag for inhibiting over-recording, (ii) the date of recording, (iii) the title, (iv) the track number data on the position of the final recording on the tape 301, (v) the track number data on the position of the end of reproduction, and (vi) other data.

Among the data listed above, the RP flag is generated by the microcomputer 127 when the user depresses the over-recording protect switch on the control panel 131 at the start of recording video data; the generated RP flag is recorded as subcode data in the subcode area of each track.

The dubbing operation performed using the VTRs described above will now be described.

In this embodiment, the DIFs of the two VTRs are connected with a cable C through which dubbing data including video data, audio data, subcode data, and MIC system data are transmitted.

Further in this embodiment, through the cable C, the microcomputer 127 of the VTR 100 supplies the data for controlling the operation of the VTR 200 to the VTR 200 and it also receives data necessary for control from the VTR 200.

The following describes a series of the dubbing operations.

Figure 4:
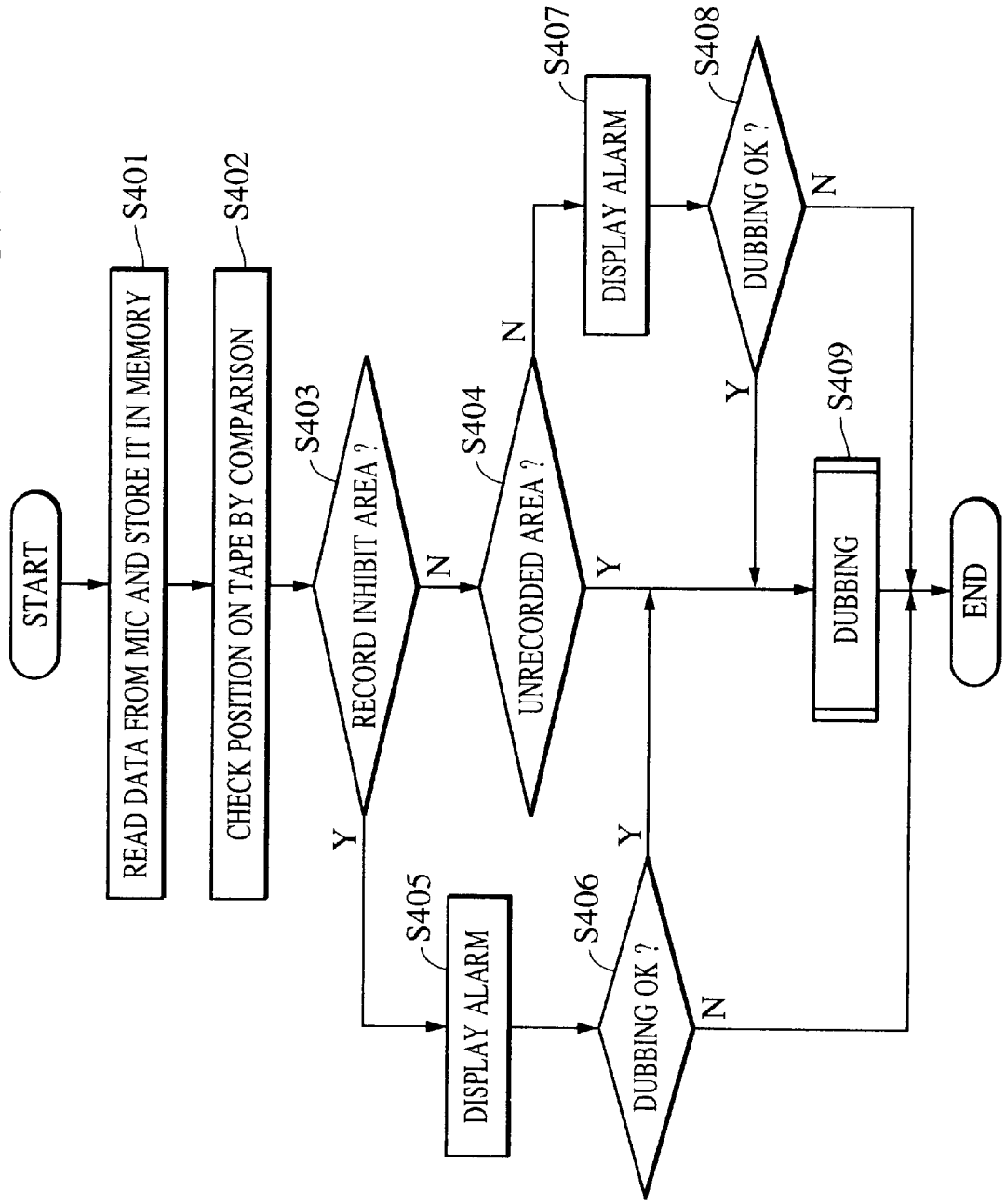
FIG. 4 is a flowchart illustrating the operation of the embodiment of the present invention.

Referring first to FIG. 4, the control operation carried out by a microcomputer 227 in the VTR 200 will be discussed.

When a cassette 400 for recording is inserted in the VTR 200, the microcomputer 227 reads system data from a MIC 401 and writes it to an internal memory (step S401). The user feeds the tape to a recording start point through a control panel 231 and pauses the tape in the desired position.

Then, the user changes the mode of the system to a dubbing mode through the control panel 131 of the VTR 100. When a command for transmitting data is issued from the VTR 100, the microcomputer 227 extracts the track number data at the stop point of a tape 403 from the reproduced subcode and it determines whether the track number is included in an over-recording protect area according to the track number data and the RP flag in the system data which has been read from the MIC 401 (steps S402 and S403). The same determination result is obtained by checking whether the RP flag is included in the subcode data reproduced from the tape 403.

If the microcomputer 227 decides that the track is included in the RP area, then it provides an indication to that effect through a display circuit, not shown, and waits for a further instruction (step S405). If the user decides that dubbing may be performed for that particular section, then he/she gives an instruction to that effect through the control panel 131 of the VTR 100 (step S406).

When dubbing is permitted, the VTR 100 controls the VTR 200 to proceed to a dubbing routine indicated by a step S409.

To inhibit dubbing, the user instructs the VTR 100 and the VTR 200 to that effect through the control panel 131.

If the microcomputer 227 decides in a step S403 that the stop position on the tape 403 is not included in the RP area, then it further determines whether the stop position is in an unrecorded area according to the reproduced subcode data and the system data received from the MIC 401 (step S404), and if it finds that it is an unrecorded area, then it immediately proceeds to the dubbing routine.

If the microcomputer 227 finds that some data has already been recorded in that area, then it issues another alarm (step S407). If the user decides that the area may be recorded over, then he/she enters an instruction to that effect through the control panel 131; if he/she decides not to record over the existing data, then he/she gives an instruction, through the control panel 131, to inhibit dubbing (step S408).

Now that the VTR 200 has been prepared, the dubbing routine is begun.

Figure 5:
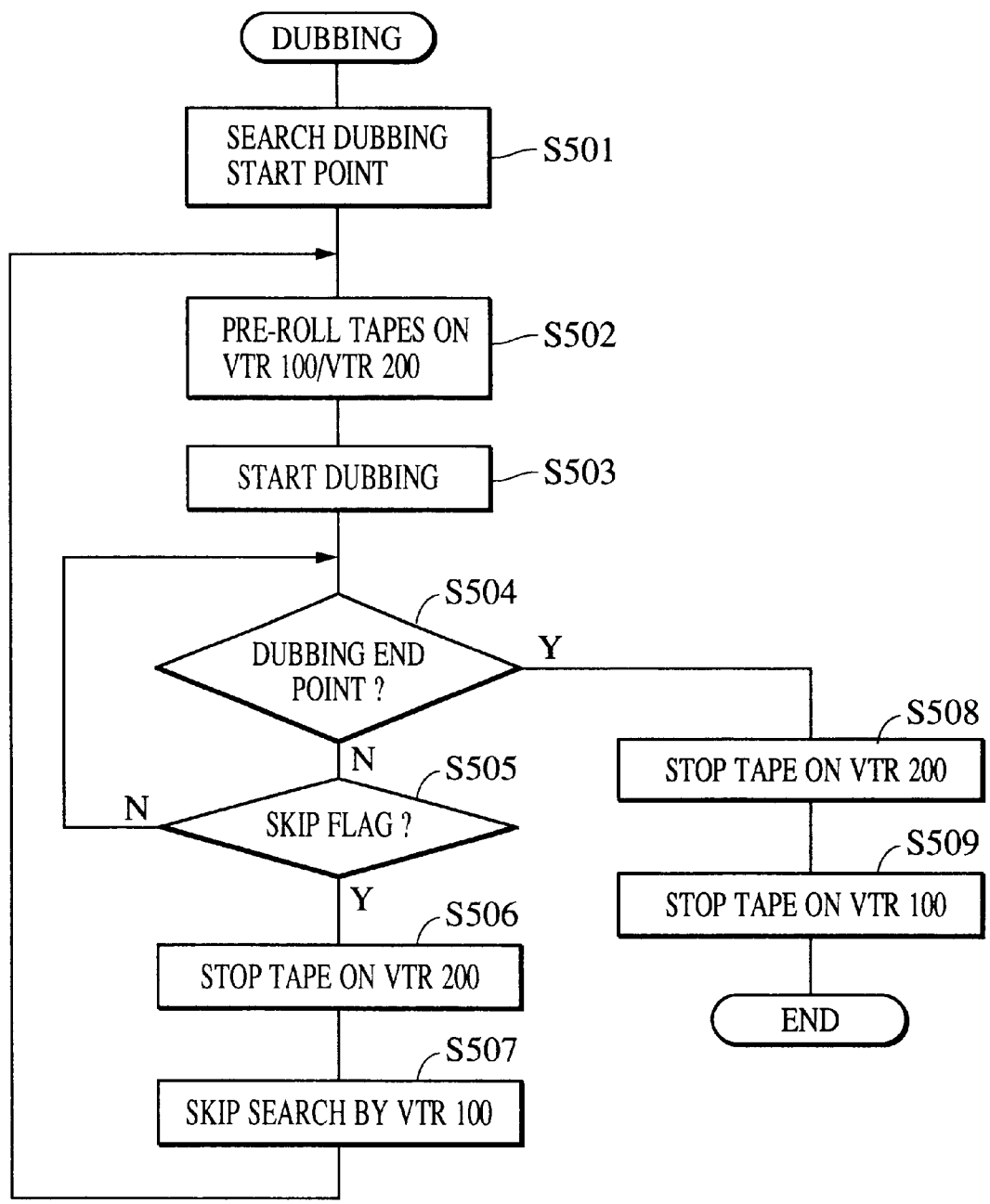
FIG. 5 is another flowchart illustrating the operation of the embodiment of the present invention.

FIG. 5 shows a flowchart illustrative of a series of operations involved in the dubbing routine shown in FIG. 4. In this embodiment, it is assumed that the start and end positions of dubbing on the tape 303 in the cassette 300 in the VTR 100 have been specified beforehand by the user and the track numbers for both positions have been extracted and stored in the memory in the microcomputer 127.

As soon as the dubbing routine is initiated, the microcomputer 127 controls the respective sections of the VTR 100 to feed the tape 303 at high speed to the dubbing start position (step S501). The microcomputer 127 then controls the VTR 100 and the VTR 200 to pre-roll the tapes 303 and 403, respectively (step S502), and places the VTR 100 in the reproducing mode and the VTR 200 in the recording mode, respectively, to start dubbing.

At this time, the DIF 129 transmits the system data related to the reproduced data, which is being dubbed, among the data read from the MIC 301 in addition to the video data, audio data, and subcode data reproduced from the tape 303.

In the VTR 200, the aforesaid data which has been received is written to the track memory 207 and the data undergoes the error correction coding process implemented by the error corrector 209 as previously described; it is then modulated by a modulator 211 before it is finally recorded on the tape 403 through a head 217.

A DIF 229 separates system data from the data received from the MIC 301 and writes the system data to a memory in the microcomputer 227.

The microcomputer 227 generates new system data based on the system data from the MIC 401 and the transmitted system data.

After the dubbing routine is started, the microcomputer 127 determines whether the position on the tape 303 which is currently being reproduced is the dubbing end position (step S504) and if the determination result is affirmative, then it stops the transmission of data to the VTR 200 and controls the VTR 200 to stop the recording of data to the tape 403 (step S508) and further stops the reproduction from the tape 303 in the VTR 100 (step S509).

If the reproducing position is not the dubbing end position, then the microcomputer 127 determines that the reproducing position on the tape 303 is in the area which need not be reproduced, i.e. the area which need not be dubbed, according to the skip flag in the system data received from the MIC 301 or when a skip flag is detected in the subcode data in the reproduced data (step S505), and controls the VTR 200 to interrupt the feed of the tape 304 (step S506), then fast feeds the tape 303 in the VTR 100 to a skip end position (step S507).

When the tape 303 is fed to the end position of the area requiring no reproduction, the microcomputer 127 goes back to the step S502 to repeat the same operation.

Thus, in this embodiment, the data in a desired area can be automatically dubbed simply by setting the start and end positions of dubbing in the tape 303 on the reproducing VTR and by specifying the start of dubbing. This enables a user to markedly shorten the time required for editing.

Moreover, a skip flag is used to determined whether a reproduction position on the tape lies in an area which need not be reproduced, and the dubbing operation is controlled according to the determination result. This enables the user to accurately and easily dub only the data in the areas to be dubbed without the need of controlling the VTRs each time an area which should not be dubbed is encountered between the start and end positions of dubbing.

Further, if the recording start position on the tape of the recording VTR is in a RP area, then the user will be so notified, thus preventing accidental erasure of important data by dubbing.

In the above embodiment, recording was implemented on the tape 303 wherein a skip flag has been recorded once. As an alternative, however, it may be arranged so that a commercial scene or other scene is detected during recording a television program or the like and a skip flag is automatically recorded.

The individual components shown in outline or designated by blocks in the drawings are all well-known in the video recording/reproducing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus employed in a system for copying encoded video data recorded on a first recording medium to a second recording medium in a recording apparatus, said reproducing apparatus comprising:

(a) reproducing means for reproducing from the first recording medium (i) the encoded video data and (ii) identification data indicating an area of the first recording medium in which the video data not to be reproduced are recorded;

(b) output means for supplying the recording apparatus with the encoded video data reproduced by said reproducing means, said recording apparatus recording the encoded video data supplied by said output means on the second recording medium; and (c) control means for controlling the recording operation of said recording apparatus and the reproducing operation of said reproducing means according to the identification data reproduced by said reproducing means.

2. An apparatus according to claim 1, wherein said control means stops the recording operation performed by said recording apparatus and fast feeds said first recording medium if a reproducing position in said first recording medium is a start position of said area in which the video data not to be reproduced are recorded.

3. An apparatus according to claim 2, wherein said reproducing means reproduces said identification data from said first recording medium which is fast fed.

4. An apparatus according to claim 3, wherein said control means feeds said first recording medium at normal speed to reproduce said video data and starts the recording operation of said recording apparatus if the reproducing position in the first recording medium is an end position of said area in which the video data not to be reproduced are recorded.

5. An apparatus according to claim 1, further comprising decoding means for decoding the video data reproduced by said reproducing means.

6. Apparatus according to claim 1, wherein the first recording medium includes a tape-shaped recording medium, and wherein said reproducing means reproduces the encoded video data and the identification data from a plurality of helical tracks formed on the tape-shaped recording medium.

7. Apparatus according to claim 1, further comprising reproduction processing means having storing means for storing the encoded video data reproduced by said reproducing means and error correction means for correcting errors in the encoded video data stored in said storing means, said output means reading the encoded image data which have been subjected to the error correction process from said storing means and supplying said recording apparatus with the encoded video data.

8. Apparatus according to claim 1, wherein said control means generates control data for controlling the recording operation of the recording apparatus, and wherein said output means supplies the recording apparatus with the control data and the encoded video data using a single cable.

9. Apparatus according to claim 1, wherein the encoded video data are encoded by a high-efficiency encoding method.

10. A recording apparatus employed in a system for (i) reproducing encoded video data recorded on a first recording medium using a reproducing apparatus, and (ii) copying the reproduced encoded video data to a second recording medium, wherein a recording operation of the recording apparatus is controlled by said reproducing apparatus, said recording apparatus comprising:

(a) receiving means for receiving from the reproducing apparatus (i) the encoded video data reproduced from said first recording medium, and (ii) identification data indicating an area of the first recording medium in which the video data not to be reproduced are recorded; and (b) recording means for recording the video data, received by said receiving means, on said second recording medium;

wherein the recording operation of said recording means is controlled in accordance with said identification data.

11. An apparatus according to claim 10, wherein said identification data indicates a start position and an end position of said area in which the video data not to be reproduced are recorded, and if a reproducing position of said first recording medium is the start position of said area, the reproducing apparatus stops the recording operation of said recording means and fast feeds said first recording medium.

12. An apparatus according to claim 11, wherein said reproducing means reproduces said identification data from said first recording medium which is fast fed.

13. An apparatus according to claim 12, wherein the reproducing apparatus feeds said first recording medium at normal speed to reproduce said video data and controls said recording apparatus to start the recording operation of said recording means when identification data which indicates the end position of said area has been reproduced from said first recording medium which is fast fed.

14. Apparatus according to claim 10, wherein the first recording medium includes a tape-shaped recording medium, and wherein said reproducing means reproduces the encoded video data and the identification data from a plurality of helical tracks formed on the tape-shaped recording medium.

15. Apparatus according to claim 10, wherein said recording means includes storing means for storing the encoded video data input by said input means and error correction processing means for error correction encoding the encoded video data stored in said storing means, said storing means reading the encoded video data error correction encoded by said error correction processing means from said storing means and recording the encoded video data on the second recording medium.

16. Apparatus according to claim 10, wherein said input means inputs the encoded video data and control data for controlling the recording operation of said recording means from the reproducing apparatus using a single cable.

17. Apparatus according to claim 10, further comprising detection means for detecting a record inhibition area in the second recording medium, said reproducing apparatus controlling the recording operation of said recording means by using a detection result of said detection means.

18. Apparatus according to claim 17, wherein said detection means provides an indication of the detection result.

19. Apparatus according to claim 10, wherein the second recording medium includes a tape-shaped recording medium, and wherein said recording means forms a plurality of helical tracks on the tape-shaped recording medium and records the encoded video data on the plurality of helical tracks.

20. Apparatus according to claim 19, wherein said recording means includes modulation means for modulating the encoded video data input by said input means by a predetermined digital modulation process, and for superimposing a pilot signal component for tracking control during reproduction of the encoded video data, said recording means recording the encoded video data modulated by said modulation means.

21. A reproducing apparatus employed in a system which reproduces encoded video data from a first storing device integrally equipped with a first recording medium and a second recording medium, which are different from each other in type, and copies the reproduced video data to a second storing device using a recording apparatus, said reproducing apparatus comprising:

(a) reproducing means for (i) reproducing the encoded video data from said first recording medium, and for (ii) reproducing identification data, which indicates a skip area in said first recording medium, from said second recording medium;

(b) output means for supplying the encoded video data, which has been reproduced by said reproducing means, to said recording apparatus; and (c) control means for controlling the reproducing operation of said reproducing means and the recording operation of said recording apparatus in accordance with the identification data which has been reproduced by said reproducing means.

22. An apparatus according to claim 21, wherein said control means has a first mode in which a normal reproducing operation for reproducing said video data by said reproducing means is stopped, then said first recording medium is fast fed, and then the recording operation of said recording apparatus is stopped, and a second mode in which a normal reproducing operation for reproducing said video data by said reproducing means is started and a recording operation of said recording apparatus is started.

23. An apparatus according to claim 22, wherein said control means is set in said first mode when a reproducing position of said first recording medium is a start position of said skip area, and wherein said control means is set in said second mode when a reproducing position of said first recording medium is an end position of said skip area.

24. A recording apparatus for use with a reproducing apparatus which reproduces encoded video data from a first storing device which is integrally equipped with a first recording medium and a second recording medium, which are different from each other in type, said recording apparatus copying the reproduced video data to a second storing device, wherein the recording operation of said recording apparatus is controlled by said reproducing apparatus, said recording apparatus comprising:

(a) receiving means for receiving (i) the encoded video data which has been reproduced from said first recording medium by said reproducing apparatus, and (ii) identification data which has been reproduced from said second recording medium by said reproducing apparatus, said identification data indicating a skip area of said first recording medium; and (b) recording means for recording the video data, received by said receiving means, to said second storing device;

wherein a recording operation of said recording means is controlled by the reproducing apparatus according to the identification data received by said receiving means.

25. A system which (i) reproduces encoded video data from a first storing device which is integrally equipped with a first recording medium and a second recording medium, which are different from each other in type, and (ii) copies the reproduced video data to a second storing device which is integrally equipped with a third recording medium and a fourth recording medium, which are also different from each other in type, said system comprising:

(A) a reproducing apparatus including;
(a) reproducing means for reproducing the encoded video data from said first recording medium, and for reproducing from said second recording medium subordinate data related to said video data,
(b) first control means for generating control data for controlling a reproducing operation of said reproducing means and a recording operation of a recording apparatus according to the subordinate data reproduced by said reproducing means, and (c) output means for outputting the reproduced encoded video data the control data generated by said first control means to an outside of said reproducing apparatus; and (B) a recording apparatus including;
(a) receiving means for receiving the reproduced encoded video data and the control data output from said output means,
(b) recording means for recording the video data received by said receiving means on said second storing device, and
(c) second control means for controlling the recording operation of said recording means in accordance with the control data received by said receiving means.

26. A system according to claim 25, wherein said subordinate data includes a skip flag which indicates a start of a skip area in said first recording medium.

27. A system according to claim 26, wherein said first control means (i) detects that a record position of said reproduced video data is the start position of said skip area according to said skip flag, (ii) generates the control data for specifying a stop of the recording operation of said recording means according to said detection result, and (iii) fast feeds said first recording medium.

28. A system according to claim 27, wherein said skip flag also indicates an end of said skip area.

29. A system according to claim 28, wherein said first control means (i) detects that the record position of said reproduced video data is the end position of said skip area according to said skip flag, (ii) feeds said first recording medium at normal speed to reproduce said digital video data, and (iii) generates the control data for specifying the start of the recording operation of said recording means in accordance with said detection result.

30. A reproducing and recording method employed with a system which reproduces digital video data from a first cassette tape using a first VTR, and copies the reproduced digital video data to a second cassette tape using a second VTR, wherein said first VTR has a normal reproduction mode and a search mode, and said second VTR has a recording mode and a recording pause mode, comprising the steps of:

automatically changing the mode of said second VTR from said recording mode to said recording pause mode when the mode of said first VTR changes from said normal reproduction mode to said search mode; and automatically changing the mode of said second VTR from said recording pause mode to said recording mode when the mode of said first VTR changes from said search mode to said normal reproduction mode.

31. A reproducing apparatus employed in a system for copying digital video data recorded on a first recording medium to a second recording medium in a recording apparatus, said reproducing apparatus comprising:

a reproducing means for reproducing from the first recording medium (i) the digital video data and (ii) identification data indicating an area of the first recording medium in which the digital video data not to be reproduced are recorded;

digital interface means for supplying said recording apparatus with the digital video data reproduced by said recording apparatus through a cable, said recording apparatus receiving the digital video data from said digital interface means and recording the digital video data on the second recording medium; and control means for controlling the recording operation of the recording apparatus and the reproducing operation of said reproducing means according to the identification data reproduced by said reproducing means, said control means generating control data for controlling the recording operation of said recording apparatus and said digital interface means supplying said recording apparatus with the control data and the digital video data through the cable.

32. Apparatus according to claim 31, further comprising reproduction means having storing means for storing the digital video data reproduced by said reproducing means, an error correction means for correcting errors in the digital video data stored in said storing means, said digital interface means reading the digital video data which had been subjected to said error correction process from the memory and supplying the recording apparatus with the digital video data read out from the memory.

33. Apparatus according to claim 31, wherein said control means controls a recording start timing and a recording stop timing of the recording apparatus.

34. Apparatus according to claim 31, wherein said reproducing means includes moving means for moving the first recording medium, said control means controlling a moving operation of said moving means.

35. Apparatus according to claim 31, wherein the digital video data recorded on the first recording medium is encoded by a high-efficiency encoding method.

36. Apparatus according to claim 35, further comprising decoding means for decoding the digital video data reproduced by said reproducing means, and output means for converting the digital video data decoded by said decoding means into analog video data and outputting the analog video data.

37. Apparatus according to claim 31, wherein said reproducing means reproduces digital audio data from the first recording medium and said digital interface means supplies the recording apparatus with the digital audio data reproduced by said reproducing means, and wherein the recording apparatus receives the digital audio data and records the digital audio data on the second recording medium.

38. Apparatus according to claim 37, wherein said digital interface means multiplexes the digital video data and the digital audio data and supplies the recording apparatus with the multiplexed digital video and audio data.

39. Apparatus according to claim 31, further comprising determining means for determining the area of the first recording medium in which the digital video data not to be reproduced are recorded and generating the identification data.

* * * * *

UNITED STATES PATENT AND TRADEMARK OFFICE
CERTIFICATE OF CORRECTION

PATENT NO. : 5,909,421
DATED : June 1, 1999
INVENTOR(S) : TOSHIYA YATOMI

It is certified that error appears in the above-identified patent and that said Letters Patent is hereby corrected as shown below:

COLUMN 3,
Line 49, "EMBODIMENT" should read --EMBODIMENTS--; and
Line 50, "An embodiment" should read --Embodiments--.

COLUMN 6
Line 23, "tion" should read --tions--.

COLUMN 13
Line 4, "data" should read --data and--.

Signed and Sealed this

First Day of February, 2000

Attest:

Attesting Officer

Q. TODD DICKINSON

Acting Commissioner of Patents and Trademarks